(12) United States Patent
Kusase et al.

(10) Patent No.: US 6,313,559 B1
(45) Date of Patent: Nov. 6, 2001

(54) STATOR ARRANGEMENT OF ROTARY ELECTRIC MACHINE

(75) Inventors: Shin Kusase, Obu; Tsutomu Shiga, Nukata-gun; Atsushi Umeda, Okazaki, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/547,110

(22) Filed: Apr. 11, 2000

(30) Foreign Application Priority Data

Apr. 14, 1999 (JP) .................................................. 11-106569

(51) Int. Cl.⁷ ...................................................... H02K 1/12
(52) U.S. Cl. .............................. 310/254; 310/179; 29/596
(58) Field of Search ................................. 310/254, 263, 310/216, 179, 218; 29/596, 606

(56) References Cited

U.S. PATENT DOCUMENTS

| Re. 34,667 | * | 7/1994 | Neumann | 310/216 |
|---|---|---|---|---|
| 3,914,859 | * | 10/1975 | Pierson | 29/596 |
| 4,402,129 | | 9/1983 | Kreuzer et al. | 29/596 |
| 4,780,635 | * | 10/1988 | Neumann | 310/216 |
| 5,097,167 | | 3/1992 | Kanayama et al. | 310/201 |
| 5,483,116 | * | 1/1996 | Kusase et al. | 310/263 |
| 5,489,811 | * | 2/1996 | Kern et al. | 310/216 |
| 5,536,987 | * | 7/1996 | Hayashi et al. | 310/263 |
| 5,570,503 | * | 11/1996 | Stokes | 29/596 |
| 5,852,335 | * | 12/1998 | Suzuki et al. | 310/254 |
| 5,925,964 | * | 7/1999 | Kusase et al. | 310/263 |
| 5,998,903 | | 12/1999 | Umeda et al. | 310/179 |
| 6,127,760 | * | 10/2000 | Nagasaki et al. | 310/254 |
| 6,127,763 | * | 10/2000 | Nakamura et al. | 310/263 |

FOREIGN PATENT DOCUMENTS

| 62-272836 | | 11/1987 | (JP) . |
|---|---|---|---|
| 63-274335 | | 11/1988 | (JP) . |
| 09-046940 | * | 3/1997 | (JP) . |

* cited by examiner

*Primary Examiner*—Joseph Waks
(74) *Attorney, Agent, or Firm*—Pillsbury Winthrop LLP

(57) ABSTRACT

In an rotary electric machine, such as a AC generator for a vehicle includes a rotor, a stator core disposed around the rotor, and stator winding, the stator core is comprised of a slot member having a plurality of slots formed at an outer periphery thereof to open radially outward and a ring member fitted to the slot member to close the plurality of slots. If the inside diameter of the slot member is Di, and the outside diameter of the ring member is Do, a diameter ratio Di/Do is equal to or larger than 76%.

10 Claims, 5 Drawing Sheets

STATOR ARRANGEMENT OF ROTARY ELECTRIC MACHINE

CROSS REFERENCE TO RELATED APPLICATION

The present application is based on and claims priority from Japanese Patent Application Hei 11-106569 filed on Apr. 14, 1999, the contents of which are incorporated herein by reference.

BACKGROUND OF THE INVENTION

1. Field of the Invention

The present invention relates to a rotary electric machine, and, particularly, an AC generator for a vehicle.

2. Description of the Related Art

An AC generator having a stator winding mounted in a stator core at a high space factor is disclosed in JP-A-62-272836, JP-A 63-274335, U.S. Pat. No. 5097167, and WO98/54823. Because the shape of the slot for accommodating the stator winding is usually rectangular, flat magnet wires can be mounted in the slot at a high space factor.

However, it has become rather difficult to mount such flat wires in the slot at a higher space factor.

SUMMARY OF THE INVENTION

Therefore, a main object of the invention is to provide a high-power rotary electric machine without further increasing the space factor.

Another object of the invention is to provide a high power electric machine which has a high energy-conversion-space volume $D^2L$.

Another object is to provide a low-noise and low-cost rotary electric machine.

According to a feature of the invention, a stator core of an AC generator for a vehicles comprised of a slot member having a plurality of slots formed at the outer periphery thereof to open radially outward and a ring member fitted to the slot member to close the plurality of slots. A diameter ratio between an inside diameter Di of the slot member and an outside diameter Do of the ring member, Di/Do, is equal to or larger than 76%. Preferably, each slot has a rectangular space, and each pair of in-slot portions disposed in a slot has a rectangular cross-section corresponding to the rectangular space.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

Figure 1:
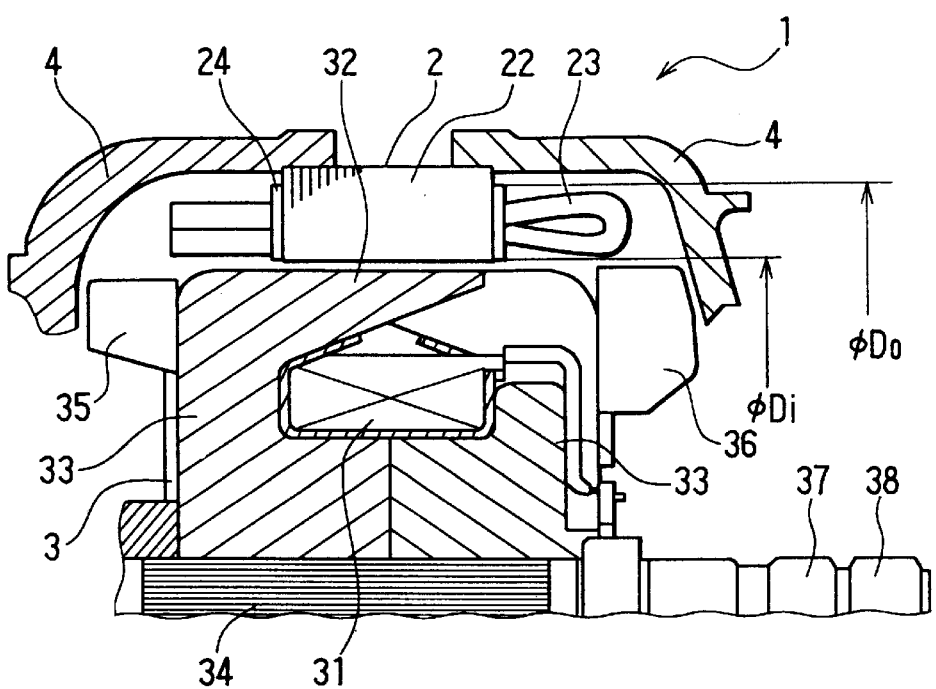
FIG. 1 is a partially cross-sectional side view of an AC generator for a vehicle according to a preferred embodiment of the invention.

As shown in FIG. 1, AC generator 1 is comprised of stator 2, rotor 3, frame 4 for supporting stator 2 and rotor 3, and a rectifier unit (not shown) connected to stator 2.

Rotor 3 is comprised of field coil 31, a pair of magnetic pole cores 33 having a common center hole and 12 claw pole pieces 32 in total, and shaft 34 force-fitted into the common center hole of pole cores 33. The pair of magnetic pole core 33 sandwiches field coil 31 from front and rear end thereof. Front pole core 33 has mixed-flow type cooling fan 35, and rear pole core 33 has centrifugal cooling fan 36. Both cooling fans 35 and 36 are respectively welded to front and rear pole cores 33. A pair of slip rings 37 and 38 is fixed to a rear portion of shaft 34 and electrically connected to field coil 31. A brush unit (not shown) is disposed to be in contact with slip rings 37 and 38 so that electric current can be supplied to field coil 31 through the brush unit and the pair of slip rings 37 and 38.

Stator 2 is comprised of stator core 22, three-phase stator winding 23, and insulators 24 insulating stator core 22 and stator winding 23. Stator core 22 is comprised of slot member 22a and outer ring member 22b. The stator core 22 has outside diameter of 121 mm and inside diameter of 102 mm. Accordingly, the diameter ratio Di/Do in % of the inside diameter to the outside diameter is 83%, and the output power can be increased because the output power is proportional to $Di^2L$, where L is an axial length of stator 2. It has been found that the ratio is preferably equal to 76% or more.

Figure 2:
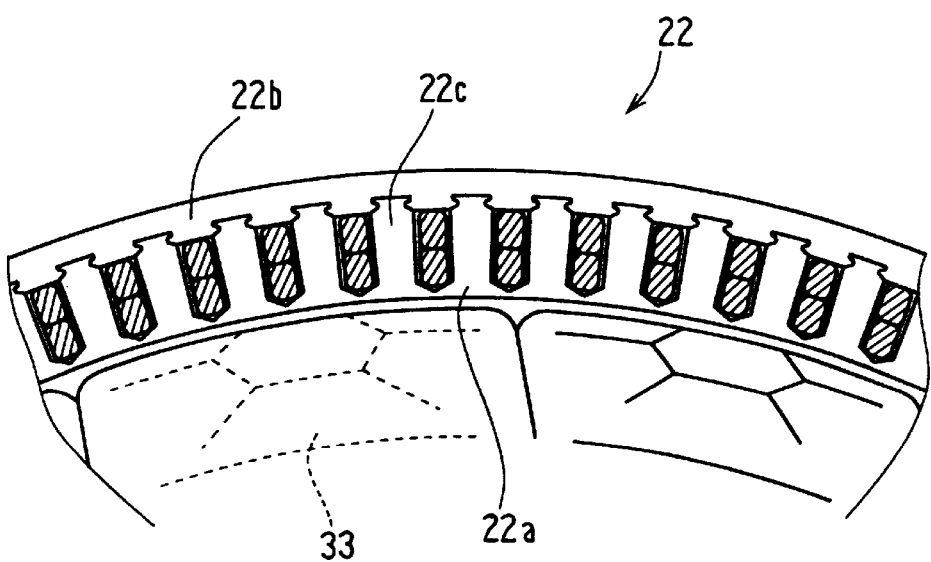
FIG. 2 is a fragmentary cross-sectional plan view of the AC generator.

Slot member 22a has a plurality (e.g. 72) of teeth 22c and rectangular slots between teeth 22c. Outer ring member 22B has a plurality (e.g. 72) of cavities at the inner periphery thereof, to which the edges of teeth 22c are respectively fitted after stator winding 23 is inserted into each slot, as shown in FIG. 2. Because the slots open radially outward, stator winding can be inserted into the slots easily. As a result, the space factor of the stator winding 23 that is, the ratio of the cross-sectional area of the stator winding in each slot to the cross-sectional area of the slot can be set equal to or more than 50% if stator winding 23 uses a magnet wire having a rectangular cross-section to be fitted to the slot.

Figure 3:
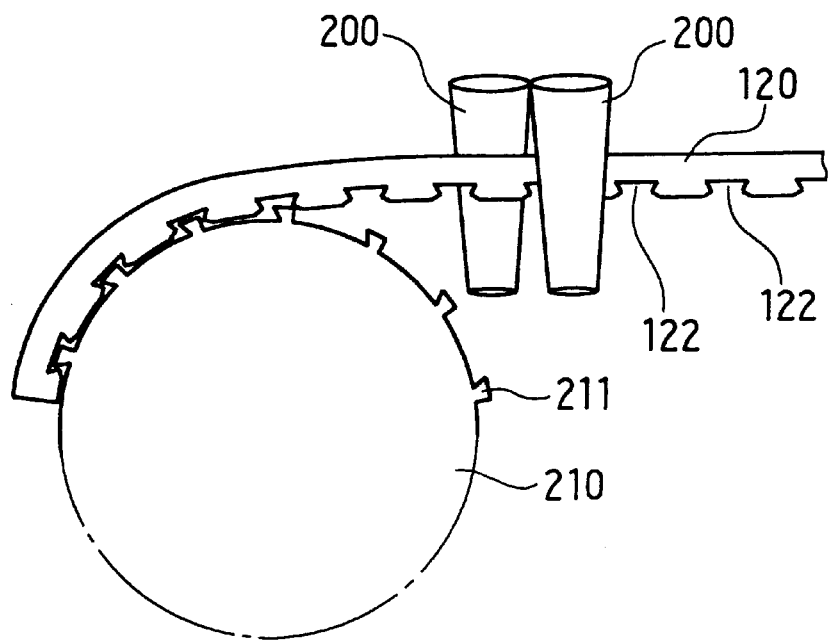
FIG. 3 is a schematic diagram illustrating a method of manufacturing a stator core of the AC generator.

As shown in FIG. 3, outer ring member 22b is formed from steel strip 120, which is wound and piled up.

Cavities 122 are formed at prescribed intervals before outer ring member 22b is wound. Thereafter, steel strip 120 is loaded between a pair of loading rollers 200. Each loading roller 200 has an inclined pressing surface so that radially outer portion of outer ring member 22b can be made thinner. As a result, outer ring member 22b has a trapezoid cross-section having a shorter side on the periphery of steel strip 120 opposite cavities 122. Accordingly, steel strip 120 is curled with cavities 122 surrounding winding roller 210. Winding roller 210 has a plurality of projections 211 on its outer periphery to engage cavities 122 so as to wind up curled steel strip 120 to a cylindrical pile having a prescribed thickness. Thereafter, the cylindrical body is separated and pressed in the thickness or axial direction and welded together, thereby forming outer ring member 22b.

Figure 4:
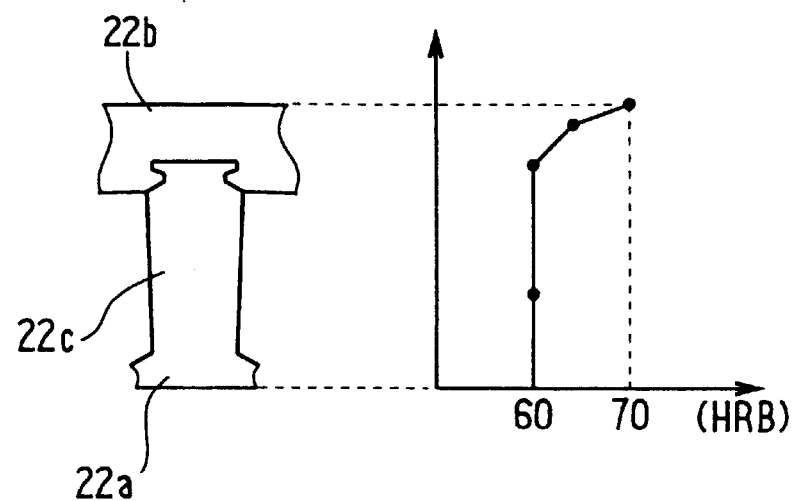
FIG. 4 is a schematic diagram and a graph showing hardness of the stator core.

The peripheral portion of outer ring member 22b has higher hardness, e.g. about 70 HRB, than other portions, e.g. about 60 HRB, as shown in FIG. 4. That is, the peripheral portion is hardened more due to work-hardening because it is pressed more by the pair of loading rollers 200. Accordingly, the outer periphery of stator core 22 provides a stiffness enough to reduce magnetic noises.

Figure 5:
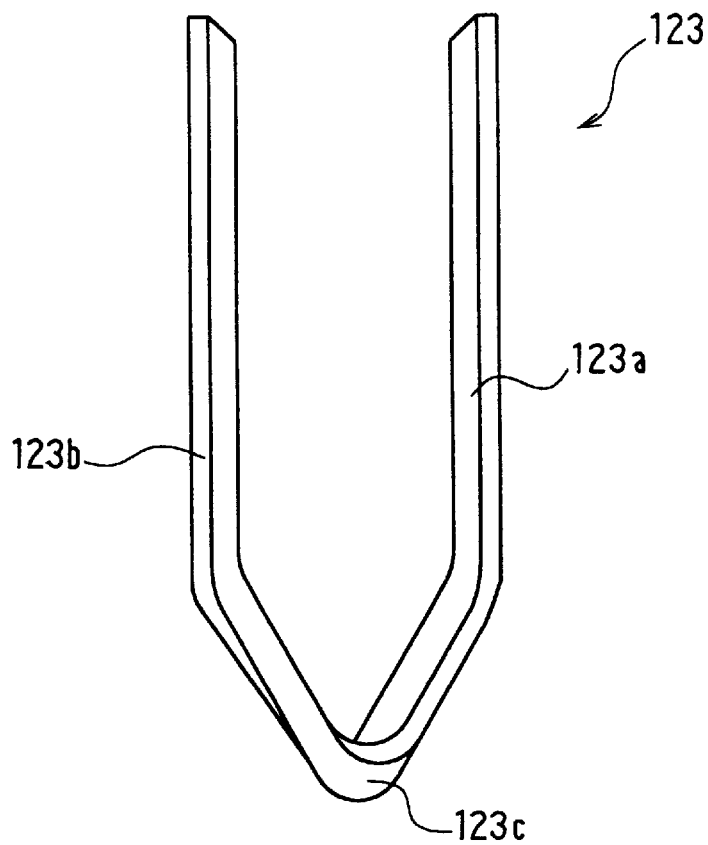
FIG. 5 is a perspective view of a U-shaped conductor segment of a stator winding mounted in the stator core.

As shown in FIG. 5, stator winding 23 is comprised of a plurality of U-shaped conductor segments 123 made of flat copper wires. U-shaped conductor segment 123 has inner layer portion 123a, outer layer portion 123b, and U-turn portion 123c. Each of inner and outer layer portions 123b and 123c has an in-slot portion disposed in the slot and a cross-over portion extending outward from the in-slot portion to be connected to a cross-over portion of another conductor segment 123.

Stator winding 23 is formed of a plurality of U-shaped conductor segments 123 connected to one another at the cross-over portions. As shown in FIG. 2, inner layer portion 123a of one conductor segments 123 and outer layer portion 123b of another conductor segment 123 are disposed in one of the slots. Conductor segment 123 and the slot are shaped so that the cross-section of two radially aligned conductor segments can neatly fit the rectangular slot. This provides a high space factor of stator winding 23. For example, the cross-sectional area of conductor segment 123 is about 2 mm$^2$, while the cross-sectional area of the slot is about 6 mm$^2$. That is the space factor of the stator winding is $(2\times2)/6=0.67$ or 67%.

Figure 6:
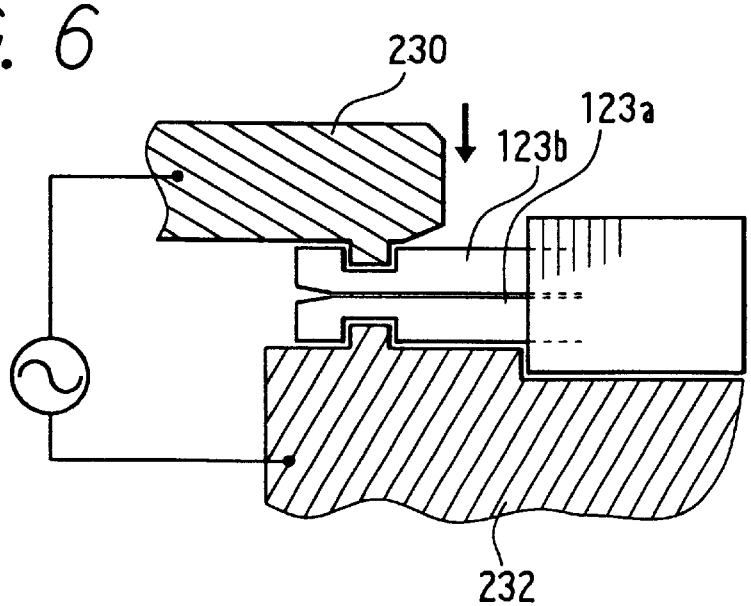
FIG. 6 is a schematic diagram illustrating a method of welding two conductor segments of the stator winding.

The cross-over portion of inner layer portion 123a disposed in one slot is welded by such as a fusing welder to the cross-over portion of outer layer portion 123b disposed in another slot that is one pole-pitch spaced apart from the former slot, as shown in FIG. 6. A pair of welder electrodes 230 and 231 is positioned inside the edge of the cross-over portion of inner and outer layer portions 123a and 123b. Conductor segments 123 are welded to each other by supplying electric current from the pair electrodes while insulation coating is covered thereon.

Figure 7:
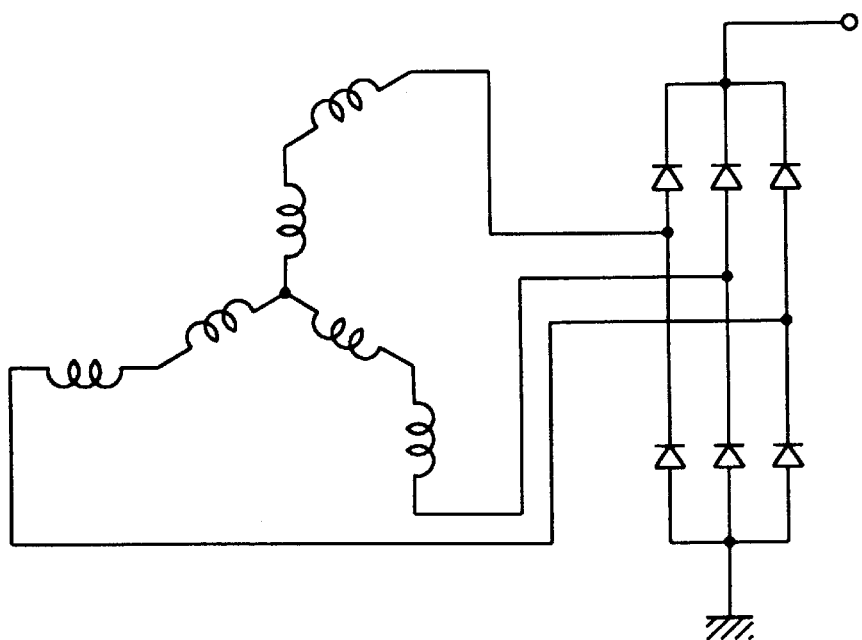
FIG. 7 is a circuit diagram of the AC generator.

The plurality of conductor segments 123 are connected to one another to form stator winding as shown in FIG. 7. For example, one phase-winding is formed from two series-connected distributed-windings having 30° phase-difference therebetween. Thus, three phase-windings are star-connected to form three-phase stator winding 23.

Figure 8:
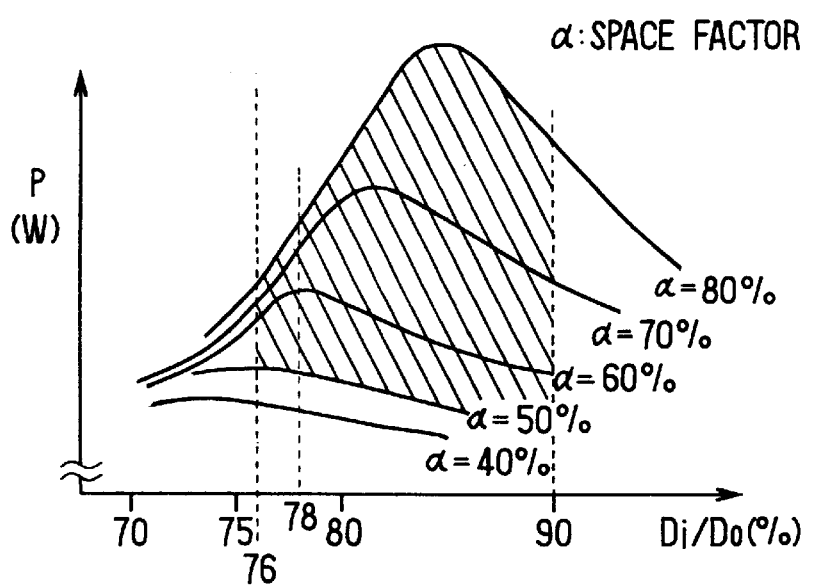
FIG. 8 is a graph showing a test result of the output power of the AC generator when diameter ratios and space factors are different.

A test result, shown in FIG. 8, shows that the output power of the AC generator increases as the diameter ratio Di/Do becomes higher than 78% and the space factor α becomes higher than 50%. In particular, if the diameter ratio Di/Do becomes higher than 83% and the space factor becomes higher than 67%, the output power is drastically increased. For example, an ordinary generator having rated power of 1.7 kw can be increased to 2.6 kW by adopting the structure according to the invention.

It has been also found that AC generator having the outside diameter between 100 mm and 150 mm has the above effect if the same structure as the above-described is adopted. The above structure can be applied to an AC generator having different number of poles, slots, or conductor segments in a slot.

(Second Embodiment)

Figure 9:
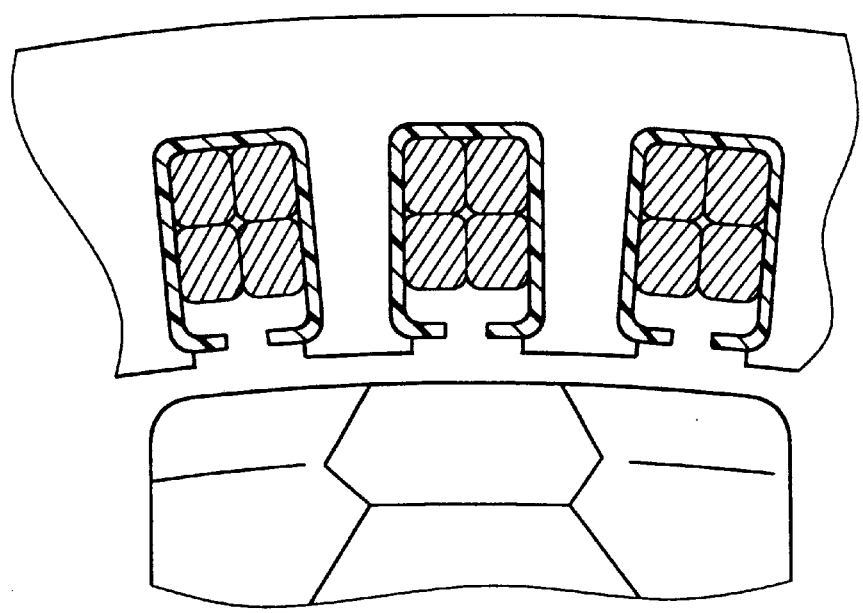
FIG. 9 is a fragmentary schematic plan view of a generator according to a second embodiment of the invention.

A stator shown in FIG. 9 has three slots each pole and four conductor segments disposed in each slot. The conductor segments can be substituted by a continuous wire having a generally square cross-section. The outside diameter of the stator is 128 mm, the inside diameter of the same is 100 mm, and the diameter ratio Di/Do is 78%. The space factor when the continuous wire is inserted into the slots is about 58%. This generator provides 1.4 times as many as the output power of a conventional type generator having the same size.

(Third Embodiment)

Figure 10:
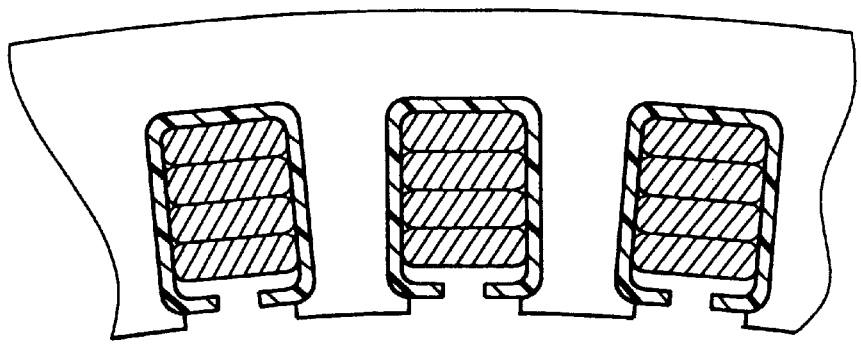
FIG. 10 is a fragmentary schematic plan view of a generator according to a third embodiment of the invention.

A stator shown in FIG. 10 has four flat conductor segments aligned in the radial direction in each slot. This arrangement also provides a high diameter ratio Di/Do.

Although the description has been made about an AC generator, this invention can be applied to various rotary electric machines, such as a motor and a motor-generator generator.

In the foregoing description of the present invention, the invention has been disclosed with reference to specific embodiments thereof. It will, however, be evident that various modifications and changes may be made to the specific embodiments of the present invention without departing from the broader spirit and scope of the invention as set forth in the appended claims. Accordingly, the description of the present invention in this document i s to be regarded in an illustrative, rather than restrictive, sense.

What is claimed is:

1. A rotary electric machine comprising:
   a rotor including a plurality of magnetic poles alternately disposed on the outer periphery thereof;
   a stator disposed around said rotor, said stator including a stator core having a plurality of slots and a stator winding disposed in said plurality of slots; wherein
   a space factor of said plurality of slots is larger than 50%, and
   a diameter ratio of an inside diameter of said stator to an outside diameter of the same is equal to or larger than 76%.

2. The rotary electric machine as claimed in claim 1, wherein outer periphery of said stator has larger hardness than inner periphery of the same.

3. The rotary electric machine as claimed in claim 1, wherein
   said stator core comprises slot portion having slots opening radially outward,
   outer ring portion fitted to the outer periphery of said slot portion, and
   said stator winding has a generally rectangular cross-section.

4. The rotary electric machine as claimed in claim 1, wherein
   said stator winding comprises a plurality of pairs of U-shaped conductor segments respectively disposed in said slots,
   each U-shaped conductor segment has a U-turn portion at one axial end of stator, a pair of in-slot portions extending from said U-turn portions into slots one-pole-pitch spaced apart from each other, and a pair of cross-over portions extending from said pair of in-slot portions at the other axial end of said stator to be connected to other cross-over portions at connection portions in a prescribed manner, and
   each said cross-over portion has an edge and said connection portion disposed inside said edge.

5. A rotary electric machine comprising a rotor having a plurality of magnetic poles and a field coil; and a stator disposed around said rotor, said stator including a stator core having a plurality of slots and a stator winding disposed in said plurality of slots; wherein said stator core comprises a slot member having said plurality of slots formed at an outer periphery to open radially outward and a ring member fitted to said outer periphery of said slot member to close said plurality of slots, said slot member has an inner periphery having an inside diameter Di, said ring member has an outside diameter Do, and a diameter ratio of the inside diameter to the outside diameter is equal to or larger than 76%.

6. The rotary electric machine as claimed in claim 5, wherein each said slot has a rectangular space, and each said pair of in-slot portions has a rectangular cross-section corresponding to said rectangular space.

7. The rotary electric machine as claimed in claim 6, wherein said stator winding comprises a plurality of pairs of U-shaped conductor segments respectively disposed in said slots, each U-shaped conductor segment has a U-turn portion at one axial end of stator, a pair of in-slot portions extending from said U-turn portions into slots one-pole-pitch spaced apart from each other, and a pair of cross-over portions extending from said pair of in-slot portions at the other axial end of said stator to be connected to other cross-over portions at connection portions in a prescribed manner, and each said cross-over portion has an edge and said connection portion disposed inside said edge.

8. The rotary electric machine as claimed in claim 7, wherein said diameter ratio is larger than 83%.

9. A rotary electric machine comprising:

a rotor including a plurality of magnetic claw poles, permanent magnets disposed between said claw poles and a field coil disposed inside said claw poles;

a stator disposed around said rotor, said stator including a slot member having a plurality of rectangular slots formed at an outer periphery to open radially outward and a ring member fitted to said slot member to close said plurality of slots, an inner periphery of said slot member having an inside diameter Di, an outer periphery of said ring member having an outside diameter Do; and a stator winding including a plurality of pairs of in-slot portions, each pair of said in-slot portions having a generally rectangular cross-section and being fitted to one of said plurality of slots; wherein a diameter ratio of the inside diameter to the outside diameter is equal to or larger than 76%.

10. The rotary electric machine as claimed in claim 9, wherein said stator winding comprises a plurality of pairs of U-shaped conductor segments respectively disposed in said slots, each U-shaped conductor segment has a U-turn portion at one axial end of stator, a pair of in-slot portions extending from said U-turn portions into slots one-pole-pitch spaced apart from each other, and a pair of cross-over portions extending from said pair of in-slot portions at the other axial end of said stator to be connected to other cross-over portions at connection portions in a prescribed manner, and each said cross-over portion has an edge and said connection portion disposed inside said edge.

* * * * *